(12) United States Patent
Flosbach et al.

(10) Patent No.: US 10,233,353 B2
(45) Date of Patent: Mar. 19, 2019

(54) WATERBORNE BASE COAT COMPOSITIONS AND PROCESSES FOR PREPARING WATERBORNE BASE COAT COMPOSITIONS

(71) Applicant: AXALTA COATING SYSTEMS IP CO., LLC, Wilmington, DE (US)

(72) Inventors: Carmen Flosbach, Wuppertal (DE); Petra Stoffel, Cologne (DE); Gabriele Buettner, Ratingen (DE)

(73) Assignee: AXALTA COATING SYSTEMS IP CO., LLC., Wilmington, DE (US)

( * ) Notice: Subject to any disclaimer, the term of this patent is extended or adjusted under 35 U.S.C. 154(b) by 208 days.

(21) Appl. No.: 14/440,126

(22) PCT Filed: Nov. 14, 2013

(86) PCT No.: PCT/US2013/070064
§ 371 (c)(1),
(2) Date: May 1, 2015

(87) PCT Pub. No.: WO2014/078514
PCT Pub. Date: May 22, 2014

(65) Prior Publication Data
US 2015/0315414 A1 Nov. 5, 2015

Related U.S. Application Data

(60) Provisional application No. 61/727,226, filed on Nov. 16, 2012.

(51) Int. Cl.
| | | |
|---|---|---|
| *B05D 1/00* | (2006.01) |
| *B05D 7/00* | (2006.01) |
| *C08G 18/08* | (2006.01) |
| *C08G 18/12* | (2006.01) |
| *C08G 18/28* | (2006.01) |
| *C08G 18/32* | (2006.01) |
| *C08G 18/34* | (2006.01) |
| *C08G 18/42* | (2006.01) |
| *C08G 18/66* | (2006.01) |
| *C08G 18/75* | (2006.01) |
| *C08G 18/80* | (2006.01) |
| *C08L 33/12* | (2006.01) |
| *C08L 75/14* | (2006.01) |
| *C08F 283/00* | (2006.01) |
| *C09D 175/04* | (2006.01) |
| *C09D 175/06* | (2006.01) |

(52) U.S. Cl.
CPC .......... *C09D 175/06* (2013.01); *B05D 1/007* (2013.01); *B05D 7/532* (2013.01); *C08F 283/008* (2013.01); *C08G 18/0823* (2013.01); *C08G 18/12* (2013.01); *C08G 18/283* (2013.01); *C08G 18/348* (2013.01); *C08G 18/4216* (2013.01); *C08G 18/6659* (2013.01); *C08G 18/755* (2013.01); *C08G 18/758* (2013.01); *C08G 18/8048* (2013.01); *C09D 175/04* (2013.01)

(58) Field of Classification Search
CPC .............................. C08F 299/06; C08G 18/12
USPC ........................................................ 525/455
See application file for complete search history.

(56) References Cited

U.S. PATENT DOCUMENTS

| | | | | |
|---|---|---|---|---|
| 4,822,849 A * | 4/1989 | Vanderlaan | ............ | C08G 18/68 473/118 |
| 5,331,039 A * | 7/1994 | Blum | ................. | C08G 18/0819 524/507 |
| 5,334,420 A * | 8/1994 | Hartung | ................. | B05D 7/532 427/407.1 |
| 6,001,915 A * | 12/1999 | Schwarte | ............ | C08F 283/006 428/423.1 |
| 6,001,924 A * | 12/1999 | Dobert | ................ | C08F 283/006 427/372.2 |
| 6,080,296 A * | 6/2000 | Lieverz | .................. | B05D 7/577 204/486 |
| 6,429,256 B1* | 8/2002 | Vandevoorde | ..... | C08G 18/6254 524/507 |
| 6,521,700 B1* | 2/2003 | Dworak | ............. | C08G 18/0823 524/589 |
| 6,787,596 B1* | 9/2004 | Maier | .................. | C08F 283/006 524/507 |

(Continued)

FOREIGN PATENT DOCUMENTS

| | | | |
|---|---|---|---|
| DE | 10004499 A1 | 8/2001 | |
| EP | 0353797 A1 * | 2/1990 | ............ C08F 299/06 |
| WO | 2009117330 A1 | 9/2009 | |

OTHER PUBLICATIONS

EPO, International Preliminary Report on Patentability for Application No. PCT/US2013/070064, dated May 28, 2015.

(Continued)

*Primary Examiner* — Brieann R Johnston
(74) *Attorney, Agent, or Firm* — Lorenz & Kopf, LLP

(57) ABSTRACT

Waterborne base coat compositions and processes for preparing base coat/clear top coat multi-layer coatings are provided. In an embodiment, a waterborne base coat composition includes water, pigment(s) and resin solids consisting of about 60 to 100 wt. % of binder solids and 0 to about 40 wt. % of crosslinker solids, the binder solids consisting of about 1 to about 40 wt. % of a urethanized polyester/(meth)acryl copolymer hybrid binder having a hydroxyl number of about 30 to about 200 mg KOH/g and a carboxyl number of about 8 to 50 mg KOH/g, and about 60 to about 99 wt. % of one or more further binders, the sum of the respective wt. % in each case equaling 100 wt. %.

18 Claims, No Drawings

(56) References Cited

U.S. PATENT DOCUMENTS

| | | | | |
|---|---|---|---|---|
| 6,822,038 B1* | 11/2004 | Gross | ............... | C09D 175/04 |
| | | | | 524/123 |
| 7,297,375 B2* | 11/2007 | Wegner | ............... | C09D 175/00 |
| | | | | 427/372.2 |
| 2004/0161538 A1* | 8/2004 | Boehme | ............... | C08F 283/02 |
| | | | | 427/372.2 |
| 2007/0106019 A1* | 5/2007 | Schwarte | ............... | C08F 283/006 |
| | | | | 524/589 |
| 2011/0020554 A1* | 1/2011 | Dahm | ............... | C08G 18/281 |
| | | | | 427/385.5 |
| 2017/0369728 A1* | 12/2017 | Campbell | ............... | C09D 17/004 |

OTHER PUBLICATIONS

EPO, International Search Report and Written Opinion for Application No. PCT/US2013/070064, dated Jan. 21, 2014.

SIPO, Chinese Office Action issued in Application No. 201380060182.5, dated Feb. 27, 2017.

\* cited by examiner

WATERBORNE BASE COAT COMPOSITIONS AND PROCESSES FOR PREPARING WATERBORNE BASE COAT COMPOSITIONS

CROSS-REFERENCE TO RELATED APPLICATIONS

This application is a U.S. National-Stage entry under 35 U.S.C. § 371 based on International Application No. PCT/US2013/070064, filed Nov. 14, 2013, which was published under PCT Article 21(2) and which claims priority to U.S. Provisional Application No. 61/727,226, filed Nov. 16, 2012, which are all hereby incorporated in their entirety by reference.

TECHNICAL FIELD

The technical field relates to waterborne base coat compositions comprising a hydroxyl-functional urethanized polyester/(meth)acryl copolymer hybrid binder. The technical field relates also to processes for preparing the base coat layer of a base coat/clear top coat multi-layer coating.

BACKGROUND

Multi-layer coatings of the color- and/or special effect-imparting base coat/outer protective and gloss-imparting clear top coat type are state of the art in the field of automotive coating, which includes automotive refinish coating as well as automotive OEM (original equipment manufacturer) coating of vehicles and vehicle parts. It is also state of the art to apply the base coat layer of said multi-layer coatings from environmentally-friendly waterborne base coat compositions.

There is still a need for the development of waterborne base coat compositions with improved stability. This is particularly true with regard to aqueous effect base coat compositions, especially aqueous metallic base coat compositions. Waterborne base coat compositions with a tendency towards instability often exhibit an undesired color shift over time, especially in case of aqueous OEM base coat compositions which are typically conveyed in circulating lines.

SUMMARY

Waterborne base coat compositions and processes for preparing base coat/clear top coat multi-layer coatings are provided. In an exemplary embodiment, a waterborne base coat composition is provided. The waterborne base coat composition has a resin solids comprising about 60 to 100 wt. % (weight-%) of binder solids and 0 to about 40 wt. % of crosslinker solids, the binder solids comprising about 1 to about 40 wt. % of a urethanized polyester/(meth)acryl copolymer hybrid binder having a hydroxyl number of about 30 to about 200 mg KOH/g and a carboxyl number of about 8 to about 50 mg KOH/g, and about 60 to about 99 wt. % of one or more additional binders, the sum of the respective wt. % in each case equaling 100 wt. %.

In another embodiment, a process for preparing a base coat/clear top coat multi-layer coating includes providing a substrate to be provided with a base coat/clear top coat multi-layer coating, spray-applying a waterborne base coat composition as described above on the substrate to form a base coat layer, spray-applying a clear coat composition on the base coat layer to form a clear top coat layer, and jointly curing the base coat and the clear top coat layers.

DETAILED DESCRIPTION OF THE EMBODIMENTS

The following detailed description is merely exemplary in nature and is not intended to limit the various embodiments or the application and uses thereof. Furthermore, there is no intention to be bound by any theory presented in the preceding background or the following detailed description.

As noted above, a waterborne base coat composition is provided herein. The waterborne base coat composition has a resin solids comprising about 60 to 100 wt. % (weight %) of binder solids and 0 to about 40 wt. % of crosslinker solids, the binder solids comprising about 1 to about 40 wt. % of a urethanized polyester/(meth)acryl copolymer hybrid binder having a hydroxyl number of about 30 to about 200 mg KOH/g and a carboxyl number of about 8 to about 50 mg KOH/g, and about 60 to about 99 wt. % of one or more further binders, the sum of the respective wt. % in each case equaling 100 wt. %.

In an embodiment, the urethanized polyester/(meth)acryl copolymer hybrid binder can be obtained by free-radical copolymerization of free-radically copolymerizable olefinically unsaturated monomers comprising (meth)acryl compounds (compounds having one or more (meth)acryloyl groups in the molecule) in the presence of an aqueous dispersion of a urethanized polyester which is an esterification product made of a polyurethane resin with a carboxyl number of about 50 to about 200 mg KOH/g and a polyester polyol with a hydroxyl number of about 70 to about 300 mg KOH/g.

It has been found that the waterborne base coat composition has an improved stability when compared with a similar waterborne base coat composition having a binder solids not comprising the about 1 to about 40 wt. % of the urethanized polyester/(meth)acryl copolymer hybrid binder.

The term "(meth)acryl" is used herein; it shall mean acryl and/or methacryl.

In the description and the claims a distinction is made between "solids", "resin solids", "binder solids" and "crosslinker solids" of the waterborne base coat composition contemplated herein. The term "solids" means non-volatile components. For example, the solids of a color- and/or effect-imparting waterborne base coat composition are formed by its resin solids plus pigments plus optionally present fillers (extenders) plus optionally present non-volatile additives. Resin solids means binder solids plus, if present, crosslinker solids. Binder solids means the solids contribution of one or more binders. Crosslinker solids means the solids contribution of one or more crosslinkers. The solids of a volatile matter-containing coating composition or a coating intermediate like, for example, a binder solution or a binder dispersion, can be determined in accordance with DIN EN ISO 3251 (60 minutes 150° C.).

The solids of the waterborne base coat composition contemplated herein comprise any non-volatile constituents including the resin solids and any further components making a solids contribution like pigments and, if present, fillers and non-volatile additives.

The waterborne base coat composition contemplated herein has a solids content, for example, in the range of about 10 to about 50 wt. %.

The waterborne base coat composition contemplated herein comprises water, pigment(s) and resin solids. It may further comprise the following optional components:

filler(s), organic solvent(s) and conventional additive(s). The waterborne base coat composition has a ratio by weight of pigments to resin solids of, for example, about 0.05:1 to about 2.5:1.

The resin solids content of the waterborne base coat composition contemplated herein may range, for example, from about 10 to about 40 wt. %, wherein the wt. % is based on the total weight of the waterborne base coat composition. The resin solids composition of the waterborne base coat composition is about 60 to 100 wt. % binder solids plus 0 to about 40 wt. % crosslinker solids, wherein the sum of the wt. % totals 100 wt. %. Pigment paste resins which may be contained in the waterborne base coat composition are counted as binders. The binder solids of the waterborne base coat composition consists of about 1 to about 40 wt. % of the urethanized polyester/(meth)acryl copolymer hybrid binder and about 60 to about 99 wt. % of one or more other binders, wherein the sum of the wt. % totals 100 wt. %. In a preferred embodiment, the binder solids consists of about 5 to about 25 wt. % of the urethanized polyester/(meth)acryl copolymer hybrid binder and about 75 to about 95 wt. % of one or more other binders, the sum of the wt. % equaling 100 wt. %.

The urethanized polyester/(meth)acryl copolymer hybrid binder has a hydroxyl number of about 30 to about 200 mg KOH/g, preferably about 40 to about 150 mg KOH/g and a carboxyl number of about 8 to about 50 mg KOH/g, preferably about 10 to about 40 mg KOH/g. Its weight average molar mass may be, for example, about 5000 to about 10000.

The term "weight average molar mass" is used herein. It shall mean the weight average molar mass determined by gel permeation chromatography (GPC; divinylbenzene-crosslinked polystyrene as the immobile phase, tetrahydrofuran as the liquid phase, polystyrene standards).

As already mentioned, the urethanized polyester/(meth)acryl copolymer hybrid binder can be obtained by free-radical copolymerization of free-radically copolymerizable olefinically unsaturated monomers comprising (meth)acryl compounds in the presence of an aqueous dispersion of an esterification product made of a polyurethane resin with a carboxyl number of about 50 to about 200 mg KOH/g and a polyester polyol with a hydroxyl number of about 70 to about 300 mg KOH/g.

The urethanized polyester/(meth)acryl copolymer hybrid binder comprises a urethanized polyester part and a (meth)acryl copolymer part. The urethanized polyester part may make up, for example, about 25 to about 45 wt. % of the urethanized polyester/(meth)acryl copolymer hybrid binder, while the remaining wt. % are made up by the (meth)acryl copolymer part. The weight ratio between (meth)acryl copolymer part and urethanized polyester part in the urethanized polyester/(meth)acryl copolymer hybrid binder is formed by the ratio of the total weight of the olefinically unsaturated monomers employed in the aforedescribed free-radical copolymerization reaction and the total weight of the urethanized polyester within the aqueous urethanized polyester dispersion in the presence of which the olefinically unsaturated monomers are copolymerized.

The urethanized polyester part of the urethanized polyester/(meth)acryl copolymer hybrid binder is a urethanized polyester in the form of an esterification product made of a polyurethane resin with a carboxyl number of about 50 to about 200 mg KOH/g and a polyester polyol with a hydroxyl number of about 70 to about 300 mg KOH/g. The polyurethane resin may have a weight average molar mass of, for example, about 3000 to about 9000, and the polyester polyol may have a carboxyl number of, for example, 0 to about 30 mg KOH/g and a weight average molar mass of, for example, about 2000 to about 4000.

Polyurethane resins with a carboxyl number of about 50 to about 200 mg KOH/g can be produced, as is known to a person skilled in the art, by reacting polyisocyanates with hydroxycarboxylic acids and, optionally, polyols at a stoichiometric ratio of isocyanate groups and hydroxyl groups.

Linear polyurethane resins with terminal carboxyl groups corresponding to a carboxyl number of about 50 to about 200 mg KOH/g are preferred; especially preferred are linear polyurethane resins with terminal and lateral carboxyl groups corresponding to a total carboxyl number of about 50 to about 200 mg KOH/g. Polyurethane resins of this type can be produced by reacting diisocyanates with monohydroxycarboxylic acids and diols or with monohydroxycarboxylic acids and dihydroxycarboxylic acids and, optionally, although less preferred, diols. Said addition reactions can be carried out in the absence or in the presence of an organic solvent (mixture) which is inert to isocyanate groups. Generally, the addition reactions are carried out at a temperature ranging from about 60 to about 100° C.

Examples of polyisocyanates which may be used to produce the carboxyl-functional polyurethane resins include polyisocyanates having two or more than two free isocyanate groups corresponding to a content of free isocyanate of, for example, from about 10 to about 50 wt. %.

Examples of suitable polyisocyanates include diisocyanates, such as, phenylene, toluylene, xylylene, naphthylene or diphenylmethane diisocyanate, 1,6-hexane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate.

Examples of polyisocyanates having more than two isocyanate groups comprise trisisocyanatononane and polyisocyanates derived from the diisocyanates stated in the preceding paragraph. Such examples comprise oligomers of the diisocyanates or isocyanurate, uretdione or biuret derivatives of the diisocyanates or isocyanate-functional adducts of the diisocyanates and compounds having at least three groups containing active hydrogen per molecule, in particular, polyols, polyamines and/or aminoalcohols, such as, for example, trimethylolpropane, glycerol, diethylene triamine and 1:1-adducts of dialkanolamines and cyclic carbonate.

Examples of hydroxycarboxylic acids which may be used to produce the carboxyl-functional polyurethane resins include monohydroxycarboxylic acids, such as, glycolic acid (hydroxyacetic acid), malic acid, 12-hydroxystearic acid, 4-hydroxybenzoic acid, citric acid, or 1:1-adducts of monoepoxy compounds and dicarboxylic acids, for example, corresponding adducts of glycidyl ethers or glycidyl esters, such as, glycidyl versatate with dicarboxylic acids, and polyhydroxycarboxylic acids, such as, tartaric acid, dimethylolpropionic acid and dimethylolbutyric acid.

Examples of polyols which may be used to produce the carboxyl-functional polyurethane resins include diols, such as, ethylene glycol, the isomeric propane- and butanediols, 1,5-pentanediol, 1,6-hexanediol, 1,10-decanediol, 1,12-dodecanediol, neopentyl glycol, butylethylpropanediol, trimethylhexane diol, diethylene glycol, triethylene glycol, tripropylene glycol, the isomeric cyclohexanediols, the isomeric cyclohexanedimethanols, hydrogenated bisphenols, tricyclodecanedimethanol, dimer fatty alcohol, bisphenol A, and polyols with more than two hydroxyl groups, such as, glycerol, trimethylolpropane, trimethylolethane, pentaerythritol, dipentaerythritol, ditrimethylolpropane, sorbitol and mannitol.

Polyester polyols with a hydroxyl number of about 70 to about 300 mg KOH/g and a carboxyl number of, for example, 0 to about 30 mg KOH/g can be produced by polycondensation of polyols with polycarboxylic acids or with suitable polycarboxylic acid derivatives, such as, for example, corresponding esters or anhydrides. Hydroxycarboxylic acids, monoalcohols, monocarboxylic acids and/or epoxide compounds may, optionally, be included in the polyester synthesis. Polycondensation may be carried out by the conventional methods known to the skilled person, for example, in the presence of conventional esterification catalysts and at elevated temperatures of, for example, about 180 to about 250° C., for example, in the melt. Optionally, entrainers, such as, for example, xylene, may also be used.

Examples of polyols which may be used to produce polyester polyols with a hydroxyl number of about 70 to about 300 mg KOH/g and a carboxyl number of, for example, 0 to about 30 mg KOH/g are the same as those which have been previously mentioned as examples of polyols which may be used to produce the carboxyl-functional polyurethane resins.

Examples of polycarboxylic acids which may be used to produce polyester polyols with a hydroxyl number of about 70 to about 300 mg KOH/g and a carboxyl number of, for example, 0 to about 30 mg KOH/g include dicarboxylic acids, such as, phthalic acid, isophthalic acid, terephthalic acid, tetrahydrophthalic acid, hexahydrophthalic acid, 1,3- and 1,4-cyclohexane dicarboxylic acid, succinic acid, adipic acid, sebacic acid, azelaic acid, dodecanedioic acid, maleic acid, fumaric acid, dimer fatty acids, and polycarboxylic acids with more than two carboxyl groups, such as, trimellitic acid and pyromellitic acid.

The polyester polyols with a hydroxyl number of about 70 to about 300 mg KOH/g and a carboxyl number of, for example, 0 to about 30 mg KOH/g may be linear, in which case they are polyesterdiols. However, branched polyester polyols with a hydroxyl number of about 70 to about 300 mg KOH/g and a carboxyl number of, for example, 0 to about 30 mg KOH/g are preferred.

As already mentioned, the urethanized polyester can be produced by esterifying a carboxyl-functional polyurethane with a carboxyl number of about 50 to about 200 mg KOH/g with a polyester polyol with a hydroxyl number of about 70 to about 300 mg KOH/g. A person skilled in the art knows how to carry out esterification reactions of this type; for example, these reactions may be performed under the conditions mentioned with regard to the production of polyester polyols with a hydroxyl number of about 70 to about 300 mg KOH/g and a carboxyl number of, for example, 0 to about 30 mg KOH/g.

After conclusion of the esterification reaction between the carboxyl-functional polyurethane resin and the polyester polyol, the formed urethanized polyester is, after the addition of a neutralizing agent, converted, by the addition of water, into an aqueous urethanized polyester binder dispersion with a solids content of, for example, about 35 to about 55 wt. %.

The (meth)acryl copolymer part of the urethanized polyester/(meth)acryl copolymer hybrid binder is a (meth)acryl copolymer that can be made by free-radically copolymerizing free-radically copolymerizable olefinically unsaturated monomers comprising one or more (meth)acryl compounds in the presence of an aqueous dispersion of the aforementioned esterification product, i.e. the urethanized polyester part of the urethanized polyester/(meth)acryl copolymer hybrid binder.

The free-radical copolymerization of the olefinically unsaturated monomers to form the (meth)acryl copolymer part of the urethanized polyester/(meth)acryl copolymer hybrid binder can be performed in a separate and subsequent step after the aqueous dispersion of the urethanized polyester has been formed. To this end, the olefinically unsaturated monomers comprising one or more (meth)acryl compounds can be free-radically copolymerized in the presence of the aqueously dispersed urethanized polyester. In other words, the urethanized polyester/(meth)acryl copolymer hybrid binder is a product that can be made by first esterifying said polyurethane resin with a carboxyl number of about 50 to about 200 mg KOH/g and said polyester polyol with a hydroxyl number of about 70 to about 300 mg KOH/g to produce the urethanized polyester, then converting the urethanized polyester into an aqueous dispersion in the presence of which said olefinically unsaturated monomers comprising one or more (meth)acryl compounds can then be free-radically copolymerized. The proportion by weight of (meth)acryl compounds among the free-radically copolymerizable olefinically unsaturated monomers lies in the range of about 50 to about 100 wt. %, wherein the wt. % is based on the total weight of the free-radically copolymerizable olefinically unsaturated monomers, i.e. the free-radically copolymerizable olefinically unsaturated monomers may be free of or they may comprise up to about 50 wt. % of free-radically polymerizable olefinically unsaturated monomers having no (meth)acryloyl groups.

A person skilled in the art knows how to carry out a free-radical copolymerization of this type. The olefinically unsaturated monomers comprising one or more (meth)acryl compounds can be free-radically polymerized under conventional conditions known to the person skilled in the art of a free-radical copolymerization performed in an aqueous phase with the addition of one or more initiators which are thermally dissociable into free radicals (free-radical initiators). The aqueously dispersed urethanized polyester is initially introduced into the reaction vessel, heated to the reaction temperature and then the olefinically unsaturated monomers and free-radical initiators are added. The duration of the free-radical copolymerization (time taken to apportion the olefinically unsaturated monomers plus the duration of a post-polymerization phase) is, for example, about 1 to about 10 hours. The polymerization temperature in the aqueous phase is, for example, about 50 to about 95° C.

The copolymerization reaction may be initiated with conventional free-radical initiators.

The free-radical initiators are used in a conventional total quantity of, for example, about 0.2 to about 2 wt. %, relative to the weight of the olefinically unsaturated monomers and may be added contemporaneously to the apportionment of the olefinically unsaturated monomers. The free-radical initiators may be added as such, as a constituent of the olefinically unsaturated monomers or as a solution. A proportion of the free-radical initiators may, however, be initially introduced and/or added once addition of the olefinically unsaturated monomers is complete. It is also possible to add the initiators completely prior to the apportionment of the olefinically unsaturated monomers.

Examples of free-radical initiators are dialkyl peroxides, such as di-tert-butyl peroxide, dicumyl peroxide; diacyl peroxides, such as dibenzoyl peroxide, dilauroyl peroxide; hydroperoxides, such as cumene hydroperoxide, tert-butyl hydroperoxide; peresters, such as tert-butyl perbenzoate, tert-butyl per-2-ethylhexanoate; peroxy dicarbonates; perketals; ketone peroxides, such as cyclohexane peroxide, methyl isobutyl ketone peroxide and azo compounds, such as azobisisobutyronitrile; C—C-cleaving initiators, such as for example benzopinacole derivatives. Preferred are water-soluble free-radical initiators, for example, hydrogen peroxide, peroxodisulfates such as sodium, potassium and ammonium peroxodisulfate, ammonium salts of 4,4'-azobis(4-cyanopentanoic acid), 2,2'-azobis(2-methyl-N-1,1-bis (hydroxymethyl)ethyl)propionamide, 2,2'-azobis(2-methyl-N-2-hydroxyethyl)propionamide as well as conventional redox initiator systems known to the person skilled in the art, such as hydrogen peroxide/ascorbic acid optionally in combination with catalytic metal salts such as iron, copper or chromium salts.

The olefinically unsaturated monomers may be added separately or with a time delay during the copolymerization.

The olefinically unsaturated monomers are apportioned, i.e. added into the aqueously dispersed urethanized polyester initial charge, which has generally already been adjusted to the copolymerization temperature.

The olefinically unsaturated monomers may be apportioned individually, as one monomer mixture or as two or more different mixtures of only some of the monomers. It is preferred to work with a monomer mixture.

The olefinically unsaturated monomers comprise olefinically monounsaturated monomers without functional groups.

Examples of olefinically monounsaturated monomers without functional groups that can be used are (cyclo)alkyl (meth)acrylates, such as methyl (meth)acrylate, ethyl (meth) acrylate, propyl (meth)acrylate, butyl (meth)acrylate, isopropyl (meth)acrylate, isobutyl (meth)acrylate, tert-butyl (meth)acrylate, pentyl (meth)acrylate, hexyl (meth)acrylate, cyclohexyl (meth)acrylate, 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate, lauryl (meth)acrylate, isobornyl (meth)acrylate, and 4-tert-butyl cyclohexyl methacrylate; monovinylaromatic compounds, such as styrene, vinyltoluenes, alpha-methylstyrene, o-, m- or p-methylstyrene, 2,5-dimethylstyrene, p-methoxystyrene, and p-tert-butylstyrene; vinyl ethers; vinyl esters, such as vinyl acetate, vinyl versatate; and non-acidic alkyl and dialkyl esters of acids like crotonic, isocrotonic, vinylacetic, itaconic, maleic, fumaric and tetrahydrophthalic acid.

The olefinically unsaturated monomers may also comprise olefinically monounsaturated, free-radically copolymerizable monomers comprising functional groups such as in particular acid groups and hydroxyl groups.

Examples of olefinically monounsaturated, free-radically copolymerizable monomers with acid groups, in particular carboxyl groups are unsaturated mono- and dicarboxylic acids and semi-esters of dicarboxylic acids, such as, for example, (meth)acrylic, itaconic, crotonic, isocrotonic, aconitic, maleic and fumaric acid, semi-esters of maleic and fumaric acid, beta-carboxyethyl (meth)acrylate, adducts of hydroxyalkyl (meth)acrylates with carboxylic anhydrides, such as, for example, phthalic acid mono-2-methacryloyloxyethyl ester, and semi-esters prepared from maleic anhydride and saturated aliphatic alcohols such as, for example, ethanol, propanol, and (iso)butanol. Preferred monomer with an acid group is (meth)acrylic acid.

Examples of olefinically monounsaturated monomers with one or more hydroxyl groups are allyl alcohol, but in particular hydroxyalkyl (meth)acrylates such as, for example, hydroxyethyl (meth)acrylate, the hydroxypropyl (meth)acrylates, the hydroxybutyl (meth)acrylates, glycerol mono(meth)acrylate, adducts of (meth)acrylic acid onto monoepoxides, such as, for example, versatic acid glycidyl ester and adducts of glycidyl (meth)acrylate onto monocarboxylic acids such as, for example, acetic acid or propionic acid. Further examples are reaction products of hydroxyl-functional monomers with caprolactone.

The olefinically unsaturated monomers may also comprise small proportions of, for example, about 1 to about 8 wt. % of olefinically di- or polyunsaturated monomers such as divinylbenzene, hexanediol di(meth)acrylate, ethylene and propylene glycol di(meth)acrylate, 1,3- and 1,4-butanediol di(meth)acrylate, vinyl (meth)acrylate, allyl (meth) acrylate, diallyl phthalate, glycerol tri(meth)acrylate, trimethylolpropane tri(meth)acrylate, pentaerythritol tetra(meth) acrylate, di- and tripropylene glycol di(meth)acrylate, hexamethylene bis(meth)acrylamide and similar compounds. Further examples are compounds which may be produced by a condensation or preferably by an addition reaction of complementary compounds, which in each case, in addition to one or more olefinic double bonds, contain one or more further functional groups per molecule. The further functional groups of the individual complementary compounds comprise pairs of mutually complementary reactive groups, in particular groups which are capable of reacting with one another for the purposes of a possible condensation or addition reaction.

Examples of olefinically polyunsaturated, free-radically polymerizable monomers produced by a condensation reaction are reaction products formed from alkoxysilane-functional (meth)acrylic monomers after hydrolysis with elimination of alcohol and formation of siloxane bridges. Further examples are reaction products formed from hydroxyalkyl (meth)acrylates and olefinically unsaturated isocyanates blocked on the isocyanate group, such as isocyanatoalkyl (meth)acrylate or m-isopropenyl-alpha,alpha-dimethylbenzyl isocyanate with elimination of the blocking agent and formation of urethane groups.

Examples of olefinically polyunsaturated, free-radically polymerizable monomers produced by an addition reaction are addition products formed from hydroxyalkyl (meth) acrylates and olefinically unsaturated isocyanates, such as isocyanatoalkyl (meth)acrylate or m-isopropenyl-alpha,alpha-dimethylbenzyl isocyanate with formation of a urethane group or reaction products formed by ring-opening addition of the epoxy group of unsaturated epoxy compounds onto the carboxyl group of an unsaturated acid with formation of an ester group and a hydroxyl group, such as, for example, the addition product formed from glycidyl (meth)acrylate and (meth)acrylic acid.

The urethanized polyester/(meth)acrylic copolymer hybrid binder may be a hybrid polymer, in which the urethanized polyester and the (meth)acrylic copolymer are present in the form of an interpenetrating polymer network and/or it may take the form of a graft copolymer formed by free-radical graft copolymerization of the olefinically unsaturated monomers onto either olefinically unsaturated double bonds in the urethanized polyester, or free-radical sites formed by H abstraction on the backbone of the urethanized polyester.

The urethanized polyester/(meth)acryl copolymer hybrid binder is typically free of free and blocked isocyanate groups (isocyanate groups blocked by monofunctional blocking agents as are conventionally used for permanently or reversibly blocking isocyanate, such as monoalcohols, ketoximes, phenols, lactams, CH-acidic compounds, pyrazoles, etc.).

As has already been mentioned, the binder solids of the waterborne base coat composition contemplated herein comprises about 60 to about 99 wt. % of one or more other binders, i.e. binders that are different from the urethanized polyester/(meth)acryl copolymer hybrid binder. Such other binders are anionically and/or non-ionically stabilized aqueous binders as are conventional in the art of aqueous paint and coatings; examples include polyesters, polyurethanes, (meth)acrylic copolymer resins and/or hybrid binders derived from these classes of binders. Anionic stabilization is preferably achieved by at least partially neutralized carboxyl groups in the binder, while non-ionic stabilization is preferably achieved by lateral or terminal polyethylene oxide units in the binder. Examples of such other binders comprise resins conventionally used as binders for coating compositions, such as, for example, (meth)acrylic copolymer resins, polyester resins, polyurethane resins as well as resin hybrids of two or more of said resin types. The other binders may in particular be hydroxyl-functional.

The waterborne base coat composition contemplated herein may contain one or more conventional crosslinkers in a proportion corresponding to a solids contribution of 0 to about 40 wt. % of the resin solids of the waterborne base coat composition. Examples of such crosslinkers include aminoplast resins, interesterification crosslinkers and crosslinkers with free or reversibly blocked isocyanate groups. Examples of aminoplast resins include benzoguanamine resins and, in particular, melamine resins. Examples of interesterification crosslinkers include trisalkoxycarbonylaminotriazines. Examples of crosslinkers with free or reversibly blocked isocyanate groups include the conventional free or blocked polyisocyanate crosslinkers known as crosslinkers for coating compositions.

The waterborne base coat composition comprises one or more conventional pigments, for example, special effect pigments and/or pigments selected from among white, colored and black pigments. In other words, the waterborne base coat composition may be a solid color (color independent on the observation angle) base coat composition or, preferably, an effect color (color having a color and/or lightness flop dependent on the observation angle) base coat composition comprising one or more special effect pigments pigments, in particular, an effect color base coat composition comprising one or more metal pigments.

Examples of special effect pigments are conventional pigments which impart to a coating color flop and/or lightness flop dependent on the angle of observation, such as, non-leafing metal pigments, for example, of aluminum, copper or other metals, interference pigments, such as, for example, metal oxide-coated metal pigments, for example, iron oxide-coated aluminum, coated mica, such as, for example, titanium dioxide-coated mica, graphite effect-imparting pigments, iron oxide in flake form, liquid crystal pigments, coated aluminum oxide pigments, coated silicon dioxide pigments.

Examples of white, colored and black pigments are the conventional inorganic or organic pigments known to the person skilled in the art, such as, for example, titanium dioxide, iron oxide pigments, carbon black, azo pigments, phthalocyanine pigments, quinacridone pigments, pyrrolopyrrole pigments, and perylene pigments.

The waterborne base coat composition contemplated herein may also contain fillers, for example, in a total proportion of 0 to about 30 wt. %, relative to the resin solids content. The fillers do not constitute part of the pigment content of the waterborne base coat composition. Examples are barium sulfate, kaolin, talcum, silicon dioxide and layered silicates.

The special effect pigments are generally initially introduced in the form of a conventional commercial aqueous or non-aqueous paste, optionally, combined with preferably water-dilutable organic solvents and additives and then mixed with aqueous binder. Pulverulent special-effect pigments may first be processed with preferably water-dilutable organic solvents and additives to yield a paste.

White, colored and black pigments and/or fillers may, for example, be ground in a proportion of the aqueous binder. Grinding may preferably also take place in a special aqueous paste resin. Grinding may be performed in conventional assemblies known to the person skilled in the art. The formulation is then completed with the remaining proportion of the aqueous binder or of the aqueous paste resin.

In addition to one or more neutralizing agents, such as, in particular, amines and/or aminoalcohols, the waterborne base coat composition may comprise conventional additives, for example, in a total proportion of about 0.1 to about 10 wt. % active substance, wherein the percentage by weight is based on total waterborne base coat composition. Examples are antifoaming agents, wetting agents, adhesion promoters, catalysts, levelling agents, anticratering agents, rheology control agents, for example, thickeners, and light stabilizers, for example, UV absorbers and/or HALS-based compounds (HALS, hindered amine light stabilizers).

The waterborne base coat composition contemplated herein comprises water in a proportion of, for example, about 30 to about 75 wt. %, wherein the wt. % is based on the total weight of the waterborne base coat composition.

The waterborne base coat composition may comprise conventional organic solvents, for example, in a total proportion of preferably less than about 25 wt. %, particularly preferably, less than about 15 wt. %, wherein the percentage by weight is based on total waterborne base coat composition. These are conventional coating solvents, which may originate, for example, from the binder production or are added separately. Examples of such solvents are alcohols, for example, propanol, butanol, hexanol, 2-ethyl hexanol, benzyl alcohol, isodecanol; glycol ethers, for example, diethylene glycol di-C1-C6-alkyl ether, dipropylene glycol di-C1-C6-alkyl ether, ethoxypropanol, methoxypropanol, butyl glycol, butoxypropanol, butyl diglycol, hexyl glycol, methoxybutanol; glycol ether esters, for example, methoxypropyl acetate, butyl glycol acetate, butyl diglycol acetate; glycols, for example, ethylene glycol and/or propylene glycol, and the di- or trimers thereof; ketones, such as, methyl ethyl ketone, methyl isobutyl ketone, acetone, cyclohexanone, 4-hydroxy-4-methyl-2-pentanone; terpene, aromatic or aliphatic hydrocarbons, for example, toluene, xylene or linear or branched aliphatic C6-C12 hydrocarbons.

In an embodiment, the waterborne base coat composition contemplated herein comprises no N-alkyl pyrrolidone solvent.

The waterborne base coat composition can in particular be used to apply the base coat layer of a base coat/clear top coat multi-layer coating. Accordingly, also provided herein is a process for preparing a base coat/clear top coat multi-layer coating comprising the steps:

(1) providing a substrate to be provided with a base coat/clear top coat multi-layer coating, (2) spray-applying the waterborne base coat composition in any of the aforedisclosed embodiments on said substrate to form a base coat layer, (3) spray-applying a clear coat composition on the base coat layer to form a clear top coat layer, and (4) jointly curing the base coat and the clear top coat layers.

The process contemplated herein that comprises steps (1) to (4) may be a refinish or an OEM base coat/clear top coat multi-layer coating process, in particular, an automotive refinish or an automotive OEM base coat/clear top coat multi-layer coating process.

In step (1) of the process a substrate is provided.

In case of a refinish base coat/clear top coat multi-layer coating process the substrate may be a substrate provided with an original coating to be repaired or refinished. Examples of substrates include in particular automotive substrates like automobile bodies, automobile body parts or other automotive parts.

In case of an OEM base coat/clear top coat multi-layer coating process the substrate is typically one made by a serial production process. In case of an automotive OEM base coat/clear top coat multi-layer coating process typical examples of such mass-produced substrates include automotive substrates like automobile bodies, automobile body parts and other car parts like, for example, rims.

Automotive substrates can be plastics or metal substrates or so-called mixed construction substrates comprising plastics as well as metal. As already said, the automotive substrates may be automotive bodies or automotive body parts; automotive bodies can be metal substrates or mixed construction substrates, while automotive body parts can be metal substrates, plastics substrates or mixed construction substrates. Automotive plastics substrates may be uncoated or they may have a precoating like a conductive primer layer or, as already mentioned, an original coating to be repaired. Automotive metal substrates may have a precoating like a conventional primer layer, for example, an EDC primer layer, and, optionally, also a conventional primer surfacer layer, or, as already mentioned, an original coating to be repaired.

In step (2) of the process contemplated herein the waterborne base coat composition is spray-applied on the substrate provided in step (1) to form a base coat layer thereon. The spray application may be performed by any conventional spray application method; in case of OEM coating the typical spray application method is electrostatically-assisted high speed rotary atomization and it may be carried out so as to spray-apply the waterborne base coat composition in one or more than one spray passes, each of which is performed by electrostatically-assisted high speed rotary atomization.

In an embodiment A of the process, step (2) may be followed by an additional step (2') prior to step (3) being performed. In such additional step (2') the same waterborne base coat composition like that employed in step (2) is pneumatically spray-applied to form a coating layer. The base coat layers applied in steps (2) and (2') have the same solids composition and together they form the base coat layer of the base coat/clear top coat multi-layer coating.

In another embodiment B of the process contemplated herein, step (2) may be followed by an additional step (2") prior to step (3) being performed. Here, the waterborne base coat composition spray-applied in step (2) comprises a free polyisocyanate crosslinker, while in said additional step (2") a waterborne base coat composition which is free of free polyisocyanate crosslinker is spray-applied to form a coating layer. The waterborne base coat composition spray-applied in additional step (2") may have the same or a different color than the waterborne base coat composition spray-applied in step (2). In other words, the waterborne base coat composition spray-applied in step (2") has the same or a different pigment composition than the waterborne base coat composition spray-applied in step (2) and it does not comprise free polyisocyanate crosslinker. The base coat layer applied in step (2) and the coating layer applied in step (2") have in any case a different overall composition, but together they form the base coat layer of the base coat/clear top coat multi-layer coating.

In a preferred variant of said embodiment B, the waterborne base coat composition spray-applied in step (2) has the same pigment composition like the waterborne base coat composition spray-applied in step (2") and it can be made from the latter by mixing it with the free polyisocyanate crosslinker or a preparation or solution thereof. In said preferred variant of embodiment B, the base coat layer applied in step (2) and the coating layer applied in step (2") have a different overall, but same pigment composition and together they form the base coat layer of the base coat/clear top coat multi-layer coating.

In still another embodiment C of the process contemplated herein, step (2) may be followed by an additional step (2''') prior to step (3) being performed. Here, a different coating composition (a coating composition other than the waterborne base coat composition employed in step (2)), in particular, another waterborne base coat composition than that employed in step (2), is spray-applied in step (2''') to form a color- and/or effect imparting coating layer which is transparent or semi-transparent. In other words, the coating layer formed in step (2''') is not visually opaque and the color of the finished multi-layer coating is determined by the color contributions of the base coat layer formed in step (2) and of the coating layer formed in step (2'''). The base coat layer applied in step (2) and the coating layer applied in step (2''') together form the base coat layer of the base coat/clear top coat multi-layer coating.

The base coat layer is the color- and/or special effect-imparting coating layer within the multi-layer coating produced by the process contemplated herein. In other words, the multi-layer coating produced by the process may have a solid color or an effect color.

The overall film thickness of the base coat layer, which may be comprised of two or more coating layers or sublayers, may be in the range of, for example, about 7 to about 40 μm.

The film thicknesses indicated herein for coating layers refer in each case to dry film thicknesses.

Application of the waterborne base coat composition or compositions can be followed by a drying procedure, in particular a brief flash-off phase of, for example, about 30 seconds to about 30 minutes at an air temperature of about 20 to about 100° C., after which in step (3) a clear coat composition is spray-applied to form the clear top coat layer in a film thickness of, for example, about 20 to about 60 μm (in particular in case of liquid clear coat) or, in an embodiment, for example, about 80 to about 150 μm (in particular in case of powder clear coat).

All known clear coat compositions are in principle suitable as the clear top coat. Usable clear coats are both solvent-borne one-component (1 pack) or two-component (2 pack) clear coats, water-dilutable 1 pack or 2 pack clear coats, powder clear coats or aqueous powder clear coat slurries.

After an optional flash-off phase, the base coat and the clear top coat layers are jointly cured in step (4), for example, by baking for about 15 to about 45 minutes at about 40 to about 185° C. object temperature, which depends, among others, on the substrate material.

EXAMPLES

In the following various embodiments described above are further illustrated by means of examples:

Example 1 (Preparation of an Aqueous Binder Latex)

16 pbw (parts by weight) of Rhodapex EST30 (anionic surfactant available from Rhodia; 30 wt % in water) were added to 688 pbw of deionized water. The water and surfactant charge was heated to 80° C. under nitrogen atmosphere and held at that temperature throughout the reaction. A first stirred monomer emulsion consisting of 45 pbw of Rhodapex EST30, 349 pbw of deionized water, 317 pbw of methyl methacrylate, 317 pbw of butyl acrylate, 36 pbw of hydroxyethyl acrylate, 36 pbw of methacrylic acid and 7 pbw of allyl methacrylate was prepared separately. A solution of 3.2 pbw of APS (ammonium peroxodisulfate) in 100 pbw of deionized water was added and the first monomer emulsion was then added within 90 minutes to the reactants. After all of the first monomer emulsion was added, the temperature was held for an additional hour at 80° C., during which a second stirred monomer emulsion consisting of 15 pbw of Rhodapex EST30, 378 pbw of deionized water, 377 pbw of methyl methacrylate, 327 pbw of butyl acrylate, 7 pbw of allyl methacrylate and a solution of 13 pbw of AMP (2-amino-2-methyl-1-propanol, 90 wt. % aqueous solution) in 98 pbw of deionized water were separately prepared. The AMP solution was added slowly to the reaction mixture and then, a solution of 1.1 pbw of APS in 70 pbw of deionized water was slowly added. The second monomer emulsion was then added within 90 minutes to the reactor content. After the addition was complete, the temperature was held at 80° C. for an additional hour. The aqueous binder latex obtained was then cooled to room temperature.

Example 2 (Preparation of an Aqueous Polyurethane Urea Resin Dispersion)

23.96 pbw of a polyesterdiol having a hydroxyl number of 112 mg of KOH/g (produced from hexanediol and a 2:1 molar mixture of adipic acid and isophthalic acid), 1.31 pbw of dimethylolpropionic acid and 1.04 pbw of triethylamine were mixed with 0.33 pbw of ethylene glycol monobutyl ether and 2.99 pbw of acetone in a flask equipped with stirrer and reflux condenser. After heating the mixture to 50° C. 9.40 pbw of isophorone diisocyanate were added and the mixture was stirred at 50° C. until an NCO number between 2.2 and 1.9% was obtained. 54.52 pbw of deionized water were then added to form an aqueous dispersion, after which 6.45 pbw of a 6.25 wt. % aqueous solution of ethylenediamine were added at 40° C. The temperature was then raised back up to 50° C. and this temperature was maintained for 2 hours. After cooling an aqueous polyurethane urea resin dispersion with 35 wt. % solids was obtained.

Example 3 (Preparation of a Solution of a Carboxyl-Functional Polyurethane)

412.5 g dicyclohexylmethane diisocyanate, 180 g 12-hydroxystearic acid, 180 g dimethylolpropionic acid and 600 g methyl ethyl ketone were introduced into a flask equipped with stirrer, thermometer and reflux condenser. The mixture was heated to 60° C. and stirred for 30 minutes. Thereafter the reaction mixture was heated to 70° C. and stirred for further 30 minutes. Then the reaction mixture was heated to reflux while stirring, until the NCO content was <0.4 wt. %. After cooling the contents of the flask were diluted by addition of 127.5 g methyl ethyl ketone.

Example 4 (Preparation of a Polyester Polyol)

375 g 1,6-hexanediol, 118 g trimethylolpropane, 389 g isophthalic acid and 118 g adipic acid were introduced into a flask equipped with stirrer, thermometer, column and distillation bridge. The contents were condensed while water of condensation was distilled off. The condensation was stopped by cooling to 80° C., after the carboxyl number of the reaction mixture had reached 10 mg KOH/g.

Example 5 (Preparation of an Aqueous Dispersion of a Urethanized Polyester)

At 80° C. 451 g of the product of Example 3 were added to the polyester polyol of Example 4 and the reaction mixture was heated to 160° C. while distilling off the methyl ethyl ketone. Esterification was carried out until a carboxyl number of 18 mg KOH/g was achieved. After cooling to 100° C. 78 g butyl diglycol were added and the contents of the flask were neutralized. To this end 25 g DMEA (dimethylethanolamine) were homogeneously mixed in and the contents of the flask were cooled to 75° C. Deionized water was added portionwise to produce a 42 wt. % aqueous urethanized polyester binder dispersion.

Example 6 (Preparation of an Aqueous Dispersion of a Urethanized Polyester/(Meth)Acryl Copolymer Hybrid Binder)

32 pbw of the aqueous dispersion of the urethanized polyester of Example 5 and 38.7 pbw of deionized water were heated to 85° C. and then a solution of 0.1 pbw of APS in 6 pbw of deionized water was added. Thereafter a mixture of 6.5 pbw of tert.-butyl acrylate, 12 pbw of butyl acrylate and 4.7 pbw of methyl methacrylate was apportioned over a period of 4 hours at 85° C. and, once apportionment was complete, the temperature was maintained at 85° C. for a further 3 hours.

Novel Example 7a and Comparative Example 7b

Grey-metallic colored waterborne base coats 7a and 7b were prepared by mixing the constituents listed in Table 1. Proportions are in pbw.

TABLE 1

Preparation of novel Example 7a and comparative Example 7b

| Example | 7a | 7b |
|---|---|---|
| Butoxy ethanol | 7 | 7 |
| Aluminum pigment [1] | 5 | 5 |
| Aqueous polyurethane urea resin dispersion of Example 2 | 4 | 4 |
| Deionized water | 12 | 12 |
| Aqueous polyurethane urea resin dispersion of Example 2 | 11 | 15 |
| Aqueous binder latex of Example | 8 | 10 |
| Defoamer [2] | 1.5 | 1.5 |
| Melamine MF900 [3] | 1.5 | 1.5 |
| Carbon Black Dispersion [4] | 3.1 | 3.1 |

TABLE 1-continued

Preparation of novel Example 7a and comparative Example 7b

| Example | 7a | 7b |
|---|---|---|
| Layered silicate composition 5) | 7 | 7 |
| Deionized water | 20 | 20 |
| Solvent mineral spirit | 2 | 2 |
| Thickener 6) | 4.9 | 4.9 |
| DMEA, 10 wt. % solution in water | 2.5 | 2.5 |
| Deionized water | 4.5 | 4.5 |
| Aqueous dispersion of a urethanized polyester/(meth)acryl copolymer hybrid binder of Example 6 | 6 | 0 |

1) STAPA ® HYDROLAN 2156 No. 55900/G from Eckart
2) SURFYNOL ® 104 (50 wt. % in dipropylene glycol methylether) from Air Products.
3) Melamine resin from Surface Specialties.
4) Mixture of 16 pbw carbon black, 13 pbw of a nonionic surfactant SOLSPERSE ® 27000 from Lubrizol, 22 pbw AMP and 48 pbw deionized water, 1 pbw of defoamer1)
5) Mixture of 3 pbw OPTIGEL ® SH from Südchemie, 3 pbw polypropylene glycol 900 and 94 pbw of deionized water.
6) Mixture of 33 pbw VISCALEX ® HV 30 from Allied Colloids, 2.5 pbw DMEA and 64.5 pbw of deionized water.

TABLE 2

Properties of novel Example 7a and comparative Example 7b

| | | |
|---|---|---|
| Visual appearance and initial brightness L* [units] 7) | Fine metallic effect; L* = 87.5 units | Relatively coarse metallic effect; L* = 95 units |
| Visual appearance and brightness after 4 days shaking L* [units] 8) | Fine metallic effect; L* = 87.4 units | Metallic effect with increased coarseness; L* = 99 units |
| Visual appearance after 4 days shaking 9) | coating material appears unchanged | coating material shows signs of instability; some separation of aluminium pigment adhered at inner bottle surface |

7) The water-borne base coats were each applied to steel test panels provided with a precoating consisting of EDC primer and primer surfacer in 14 µm dry film thickness. After flashing-off for 5 minutes at 20° C. and additional 5 minutes at 80° C. the test panels were each spray coated with a commercial two-component polyurethane clear coat in 40 µm dry film thickness and after flashing-off for 5 minutes at 20° C. baked for 20 minutes at 140° C. object temperature. The metallic effect of the multi-layer coating was visually assessed and the brightness L* (according to CIEL*a*b*, DIN 6174) at an illumination angle of 45 degrees to the perpendicular and an observation angle of 15 degrees to the specular was measured with the instrument X-Rite MA 68 sold by the firm X-Rite Incorporated, Grandeville, Michigan, U.S.A.
8) 9) The water-borne base coats were filled into plastic bottles which were then shaken for 4 days at 20° C. using a KS260 device of IKA ® Werke GmbH & Co. KG.

The wet samples were visually assessed and the test described under 7) was carried out.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A waterborne base coat composition comprising water, pigment(s) and resin solids, the resin solids comprising about 60 to 100 wt. % of binder solids and 0 to about 40 wt. % of crosslinker solids, the binder solids comprising about 1 to about 40 wt. % of a urethanized polyester/(meth) acryl copolymer hybrid binder having a hydroxyl number of about 30 to about 200 mg KOH/g and a carboxyl number of about 8 to about 50 mg KOH/g, and about 60 to about 99 wt. % of one or more additional binders, the sum of the respective wt. % in each case equaling 100 wt. %, wherein the urethanized polyester/(meth)acryl copolymer hybrid binder is obtained by free-radical copolymerization of free-radically copolymerizable olefinically unsaturated monomers comprising (meth)acryl compounds in the presence of an aqueous dispersion of a urethanized polyester, wherein the urethanized polyester is an esterification product made of a polyurethane resin with a carboxyl number of about 50 to about 200 mg KOH/g and a polyester polyol with a hydroxyl number of about 70 to about 300 mg KOH/g, and wherein the urethanized polyester and the olefinically unsaturated monomers of the urethanized polyester/(meth) acryl copolymer hybrid binder form an interpenetrating polymer network and the urethanized polyester/(meth) acryl copolymer hybrid binder takes the form of a graft copolymer formed by free-radical graft copolymerization of the olefinically unsaturated monomers onto either olefinically unsaturated double bonds in the urethanized polyester, or free-radical sites formed by H abstraction on the backbone of the urethanized polyester.

2. The waterborne base coat composition of claim 1, wherein the binder solids comprise about 5 to about 25 wt. % of the urethanized polyester/(meth)acryl copolymer hybrid binder and about 75 to about 95 wt. % of one or more other binders, the sum of the wt. % equaling 100 wt. %.

3. The waterborne base coat composition of claim 1, wherein the urethanized polyester/(meth)acryl copolymer hybrid binder comprises about 25 to about 45 wt. % of a urethanized polyester part, while the remaining wt. % comprises a (meth)acryl copolymer part.

4. The waterborne base coat composition of claim 1, wherein the polyurethane resin comprises a linear polyurethane resin with terminal carboxyl groups corresponding to a carboxyl number of about 50 to about 200 mg KOH/g.

5. The waterborne base coat composition of claim 1, wherein the polyurethane resin comprises a linear polyurethane resin with terminal and lateral carboxyl groups corresponding to a total carboxyl number of about 50 to about 200 mg KOH/g.

6. The waterborne base coat composition of claim 1, wherein the polyester polyol comprises a branched polyester polyol.

7. The waterborne base coat composition of claim 1, wherein a proportion by weight of (meth)acryl compounds among the free-radically copolymerizable olefinically unsaturated monomers is in the range of about 50 to 100 wt. %, wherein the wt. % is based on a total weight of the free-radically copolymerizable olefinically unsaturated monomers.

8. The waterborne base coat composition of claim 1, wherein a content of the resin solids is in the range of about 10 to about 40 wt. %, wherein the wt. % is based on a total weight of the waterborne base coat composition.

9. The waterborne base coat composition of claim 1, further comprising special effect pigments.

10. The waterborne base coat composition of claim 1, further comprising metal pigments.

11. The waterborne base coat composition of claim 1, further comprising water in a proportion of about 30 to about 75 wt. %, wherein the wt. % is based on a total weight of the waterborne base coat composition.

12. A process for preparing a base coat/clear top coat multi-layer coating comprising the steps of:

providing a substrate to be provided with a base coat/clear top coat multi-layer coating, spray-applying a waterborne base coat composition on said substrate to form a base coat layer, wherein the waterborne base coat composition comprises water, pigment(s) and resin solids, the resin solids comprising about 60 to 100 wt. % of binder solids and 0 to about 40 wt. % of crosslinker solids, the binder solids comprising about 1 to about 40 wt. % of a urethanized polyester/(meth)acryl copolymer hybrid binder having a hydroxyl number of about 30 to about 200 mg KOH/g and a carboxyl number of about 8 to about 50 mg KOH/g, and about 60 to about 99 wt. % of one or more additional binders, the sum of the respective wt. % in each case equaling 100 wt. %;

spray-applying a clear coat composition on the base coat layer to form a clear top coat layer, and jointly curing the base coat and the clear top coat layers; wherein spray-applying the waterborne base coat composition comprises spray-applying the waterborne base coat composition of which the urethanized polyester/(meth)acryl copolymer hybrid binder is obtained by free-radical copolymerization of free-radically copolymerizable olefinically unsaturated monomers comprising (meth)acryl compounds in the presence of an aqueous dispersion of a urethanized polyester, wherein the urethanized polyester is an esterification product made of a polyurethane resin with a carboxyl number of about 50 to about 200 mg KOH/g and a polyester polyol with a hydroxyl number of about 70 to about 300 mg KOH/g, and wherein the urethanized polyester and the olefinically unsaturated monomers of the urethanized polyester/(meth) acryl copolymer hybrid binder form an interpenetrating polymer network and the urethanized polyester/(meth) acryl copolymer hybrid binder takes the form of a graft copolymer formed by free-radical graft copolymerization of the olefinically unsaturated monomers onto either olefinically unsaturated double bonds in the urethanized polyester, or free-radical sites formed by H abstraction on the backbone of the urethanized polyester.

13. The process of claim 12, wherein the waterborne base coat composition comprises a free polyisocyanate crosslinker, and wherein after spray-applying the waterborne base coat composition and before spray-applying the clear coat composition, a waterborne base coat composition which is free of free polyisocyanate crosslinker is spray-applied to form a coating layer.

14. The process of claim 12, wherein after spray-applying the waterborne base coat composition and before spray-applying the clear coat composition, a coating composition other than the waterborne base coat composition is spray-applied to form a color- and/or effect-imparting coating layer which is transparent or semi-transparent.

15. The process of claim 12, wherein providing a substrate comprises providing an automotive body or an automotive part.

16. The process of claim 12, wherein spray-applying is performed by electrostatically-assisted high speed rotary atomization.

17. The process of claim 12, wherein spray-applying the waterborne base coat composition comprises spray-applying the waterborne base coat composition such that after jointly curing a resulting waterborne base coat layer has a dry thickness in the range of from about 7 to about 40 μm.

18. The process of claim 12, wherein jointly curing comprises subjecting the base coat and the clear top coat layers to temperatures in the range of about 40 to about 185° C. for about 15 to about 45 minutes.

* * * * *